Feb. 16, 1932. H. S. JEWETT 1,845,154
EXTENSIBLE STEM FOR FLOWERS
Filed Nov. 14, 1927
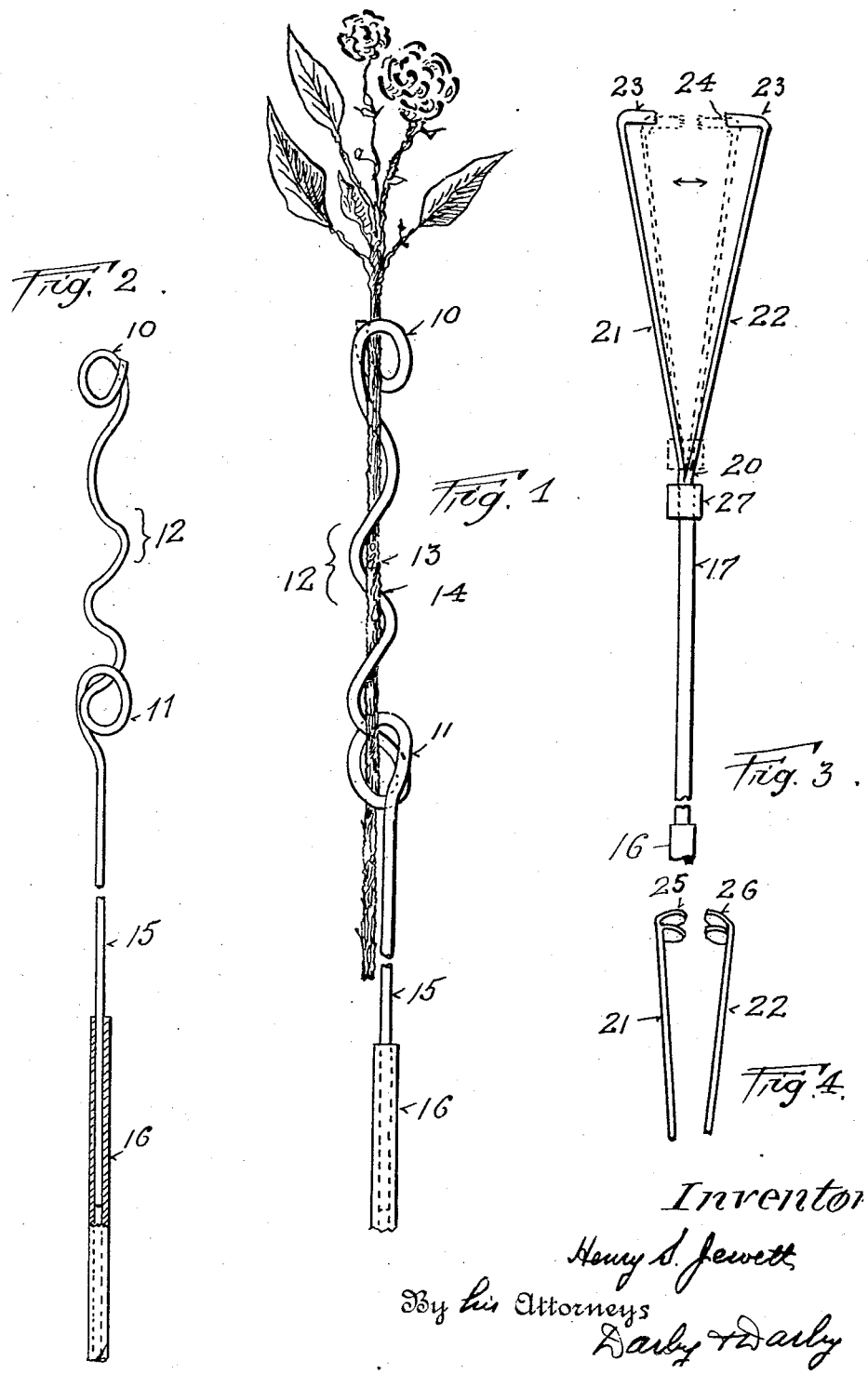
Inventor
Henry S. Jewett
By his Attorneys
Darby & Darby Patented Feb. 16, 1932

1,845,154

UNITED STATES PATENT OFFICE

HENRY S. JEWETT, OF NEW YORK, N. Y.

EXTENSIBLE STEM FOR FLOWERS

Application filed November 14, 1927. Serial No. 233,001.

This invention relates to extensible stems for holding flowers, fruits, leaves and the like by their stems. More particularly the invention relates to means for holding flowers having short stems for the purpose of arranging said flowers in vases and elsewhere.

Another object of the invention includes the provision of a simple and inexpensive holding means for holding flowers or other objects at various positions.

I further provide a holder having gripping means for readily engaging the stem of, for example, flowers at different positions and without injury to the stems so as to fit said flowers with short stems to long vases and to prevent the leaves from sinking out of sight. The holders may be colored or painted to meet the requirements and are capable of use without vases as in decorating.

Other objects will appear hereinafter and I attain these objects by the constructions shown in the accompanying drawings, in which Figure 1 is a view in elevation of a preferred form of construction and showing its application, Fig. 2 is a view in elevation showing details and viewed from the opposite side, Fig. 3 is a somewhat different form of holder, and Fig. 4 shows a suitable form of clamping jaws.

In arranging flowers for bouquets it is often difficult or impossible to arrange some flowers effectively because of their short stems. I have conceived and constructed simple yet efficient means for holding flowers by their stems at varying positions and which means may be easily adjusted for receiving flower stems of different lengths, or of varying thicknesses and quality. To this end I provide, in a preferred form, a flower stem holder having flower stem engaging loops 10, 11 spaced apart by unlooped resilient means in the nature of a spiral portion 12 formed with a number of convolutions. This coiled unlooped connection may be resilient if desired and in the form of an open corkscrew or spiral so bent as to frictionally engage the stem 13 at 14 or other intermediate coils. The looped holder may be resilient or it may be made of relatively pliable wire so as to permit easy shaping or adjusting. Below the holding part the holder is provided with a stem 15 on which is slidably held a tubular adjustable extension or sleeve 16. This extensible adjusting part may be straight in which case the part 15 has a slight bend, which is just enough to frictionally hold the parts in position. Obviously the tube may be provided with a slight bend and the part 15 made straight for adjustment as before. In either case the extension is useful as an extensible means for arranging the position of the flower holding part at different levels within the vase. The flower stem is engaged by the holding part without injuring the stem and the provision of several coils and loops provides ample holding surface and also holds firmly the more delicate or soft stemmed flowers.

In Figs. 3 and 4 I have shown a slightly different form of flower holder with clamping jaws. The form of holder shown in Fig. 3 is adapted to hold flowers having very short stems. The substantially straight stem 17 fits slidably in sleeve 16 as in the preferred form of construction. This type of holder is made from tubing which is split at its upper end and thus forms the two arms 21 and 22 which are slightly resilient and are provided with bent portions 23 terminating in flower holding jaws 24. In place of the bent parts 23 at the end of the split tube halves for some purposes I provide clamping fingers in the form of open loops 25 and 26 for holding the stems of flowers, fruit or foliage. A slip ring 27 on stem 17 provides easy means for closing the jaws or fingers in the manner shown by the dotted lines in Fig. 3.

Having now described my invention what I claim as new and useful and desire to secure by Letters Patent is:

1. A holder for engaging the stems of flowers, fruits, leaves and the like, comprising a resilient holding part having a plurality of coils for frictionally engaging and holding the said stems at variable positions and extensible means on said holder for varying the length of said holder.

2. A holder for frictionally engaging the stems of flowers, fruits, leaves and the like, comprising loops spaced apart for frictionally engaging the said stems and unlooped resilient means coacting with said loops which firmly hold the stems.

3. A holder for frictionally engaging the stems of flowers, fruits, leaves and the like, comprising loops spaced apart for frictionally engaging the said stems and a coiled unlooped resilient connection uniting said loops whereby said stems are adjustably held.

4. A holder for frictionally engaging the stems of flowers, fruits, leaves and the like, comprising loops spaced apart for engaging the said stems and unlooped resilient means for holding said loops in engagement with said stems.

5. An adjustable flow holder comprising coacting stem holding loops united by a spiral and an adjustable extension for holding the stem holding loops and uniting spiral at selected levels.

6. A holder for engaging the stems of flowers, fruits, leaves and the like, comprising an extensible adjusting part, and a looped and coiled resilient holding part slidable in said adjusting part whereby said stems are frictionally engaged and held at adjusted positions.

7. A holder for engaging the stems of flowers, fruits, leaves and the like, comprising a looped and coiled resilient holding part, having the loops and coils thereon disposed along its length to provide a plurality of convolutions for frictionally engaging and holding the said stems at variable positions.

8. A holder for engaging the stems of flowers, fruits, leaves, and the like, comprising an extensible adjusting part, a tubular member adapted to fit within said extensible part, said tubular member being split over a portion of its length at the end thereof which does not work within said extensible part and having the split portions thereof bent back to form resilient arm members, the ends of which are bent over to form holding jaws, and means on said tubular member for closing the jaws.

9. A holder for engaging the stems of flowers, fruits, leaves, and the like, comprising an extensible adjusting part, a tubular member adapted to fit within said extensible part, said tubular member being split over a portion of its length at the end thereof which does not work within said extensible part and having the split portions thereof bent back to form resilient arm members, clamping fingers formed with open loops affixed to the ends of said arm members, and means on said tubular member for closing the jaws.

10. In a holder for engaging the stems of flowers, fruits, leaves, and the like, a member for holding the stems or bodies thereof, and a second hollow tubular member in which said first named member may be adjustably positioned at selected levels.

11. The structure recited in claim 10 characterized in that said first named member is held at selected points along and within said second named member by effecting a slight bend in one or the other of said members.

In testimony whereof I have hereunto set my hand on this 11th day of November, A. D. 1927.

HENRY S. JEWETT.